(12) United States Patent
Majdali et al.

(10) Patent No.: US 12,539,889 B2
(45) Date of Patent: Feb. 3, 2026

(54) GATE SYSTEMS AND METHODS FOR ROTATING LOADING PLATFORM

(71) Applicant: Universal City Studios LLC, Universal City, CA (US)

(72) Inventors: David Gerard Majdali, Orlando, FL (US); Gregory Paul Habiak, Bryn Mawr, PA (US)

(73) Assignee: Universal City Studios LLC, Universal City, CA (US)

( * ) Notice: Subject to any disclaimer, the term of this patent is extended or adjusted under 35 U.S.C. 154(b) by 1732 days.

(21) Appl. No.: 16/552,892

(22) Filed: Aug. 27, 2019

(65) Prior Publication Data

US 2021/0062567 A1  Mar. 4, 2021

(51) Int. Cl.
  *B61B 1/02*  (2006.01)
  *A63G 7/00*  (2006.01)
  *A63G 31/00*  (2006.01)

(52) U.S. Cl.
  CPC .................. *B61B 1/02* (2013.01); *A63G 7/00* (2013.01); *A63G 31/00* (2013.01)

(58) Field of Classification Search
  CPC .... B61B 1/00; B61B 1/02; A63G 4/00; A63G 7/00; A63G 31/00; A63G 1/00; E06B 7/28; E06B 11/08
  See application file for complete search history.

(56) References Cited

U.S. PATENT DOCUMENTS

| | | | |
|---|---|---|---|
| 474,657 A | 5/1892 | Hollingsworth | |
| 780,268 A | 1/1905 | Curtiss | |
| 3,835,814 A | 9/1974 | Jacobs et al. | |
| 4,543,886 A * | 10/1985 | Spieldiener | B62D 57/00 104/73 |
| 8,960,097 B2 | 2/2015 | Fritsche | |
| 10,183,844 B1 * | 1/2019 | Howes | A63G 1/00 |
| 10,207,193 B2 * | 2/2019 | Stenzler | G06V 20/52 |
| 2007/0251407 A1 | 11/2007 | Gabriel | |
| 2013/0059670 A1 * | 3/2013 | Crawford | A63G 1/00 472/36 |

(Continued)

FOREIGN PATENT DOCUMENTS

| | | |
|---|---|---|
| CA | 2601280 A1 | 3/2000 |
| CN | 201027473 Y | 2/2008 |

(Continued)

OTHER PUBLICATIONS

PCT/US2020/047795 International Search Report and Written Opinion Nov. 13, 2020.

(Continued)

*Primary Examiner* — Cheng Lin
(74) *Attorney, Agent, or Firm* — Fletcher Yoder, P.C.

(57) ABSTRACT

Present embodiments are directed to a gate system for an amusement park attraction. The gate system includes a loading platform configured to rotate about a central vertical axis of the loading platform, and a gate positioned on the loading platform. The gate is configured to transition between a closed position and an open position. A gate actuation system is coupled to the loading platform and is configured to actuate the gate between the closed position and the open position based on feedback indicative of a position of a ride vehicle relative to the gate.

21 Claims, 6 Drawing Sheets

(56) References Cited

U.S. PATENT DOCUMENTS

2017/0334312 A1    11/2017  Zhou
2018/0179801 A1     6/2018  Alford et al.
2020/0307650 A1    10/2020  Fontiveros Penso et al.

FOREIGN PATENT DOCUMENTS

| CN | 107600077 | A |   | 1/2018  |        |         |
|----|-----------|---|---|---------|--------|---------|
| CN | 109621437 | A |   | 4/2019  |        |         |
| EP |   2607197 | A1| * | 6/2013  | ...... | B61B 1/02 |
| JP | S49119341 | A |   | 11/1974 |        |         |
| JP | S62295768 | A |   | 12/1987 |        |         |
| JP | H11268635 | A |   | 10/1999 |        |         |
| JP | 2009254801| A |   | 11/2009 |        |         |
| JP | 2019077201| A |   | 5/2019  |        |         |

OTHER PUBLICATIONS

CN Office Action for Chinese Application No. 202080060244.2 mailed Mar. 19, 2024.

JP Office Action for Japanese Application No. 2022-512346 mailed Aug. 15, 2024.

SG Office Action for Singapore Application No. 11202200968X mailed Jul. 24, 2024.

* cited by examiner

GATE SYSTEMS AND METHODS FOR ROTATING LOADING PLATFORM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to the field of amusement parks. More particularly, embodiments of the present disclosure relate to systems and methods for managing guest traffic within an attraction of an amusement park. Recently, there has been a growing interest in increasing the efficiency of loading passengers into ride vehicles of attractions of amusement parks. For example, some attractions may include loading systems that have ride vehicles continuously moving along a loading zone, such as a rotating loading platform, as passengers unload from a ride vehicle and as new passengers load into the ride vehicle. Continuous movement of the ride vehicles along the loading zone, such as along a rotating loading platform configured to accommodate future and former ride vehicle passengers, presents challenges. For example, it may be difficult to regulate or manage loading and unloading of the guests into the ride vehicles. More particularly, as the ride vehicles and the rotating loading platform may both be in motion, it may be difficult to ensure that the guests enter and exit the ride vehicle from the loading zone at an appropriate time. Accordingly, there is a need for systems and methods configured to manage guest traffic in such amusement park attractions.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a gate system for an amusement park attraction includes a loading platform configured to rotate about a central vertical axis of the loading platform, a gate positioned on the loading platform, wherein the gate is configured to transition between a closed position and an open position, and a gate actuation system coupled to the loading platform, wherein the gate actuation system is configured to actuate the gate between the closed position and the open position based on feedback indicative of a position of a ride vehicle relative to the gate.

In an embodiment, a method for controlling passenger traffic during loading or unloading of a ride vehicle of an amusement park attraction includes guiding the ride vehicle along a loading path extending about a rotating loading platform, detecting a position of the ride vehicle relative to a shotgun gate positioned on the rotating loading platform with a gate actuation system positioned on the rotating loading platform, and automatically transitioning the shotgun gate from a closed position to an open position based on the position of the ride vehicle relative to the shotgun gate.

In an embodiment, a gate system for controlling passenger traffic in a loading zone of an amusement ride includes a rotating loading platform configured to rotate about a rotational axis, wherein the rotating loading platform comprises a shotgun gate disposed thereon, a ride vehicle configured to travel along a loading path extending about the rotating loading platform, wherein the ride vehicle comprises a gate activation system configured to provide feedback indicative of a position of the ride vehicle relative to the shotgun gate, and a gate actuation system configured to receive the feedback indicative of the position of the ride vehicle relative to the shotgun gate and to transition the gate between an open position and a closed position based on the feedback.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosed embodiments generally relate to a gate system configured to manage guest traffic in a loading system of an amusement park ride or attraction. In particular, the disclosed techniques relate to a gate system configured to selectively enable and block passengers from entering and/or exiting ride vehicles and block passengers from fall hazards on a loading platform of the loading system. A portion of the loading platform may be configured to rotate as passengers load into and unload from the ride vehicles. For example, the loading platform may include a continuously rotating turntable that rotates in concert with movement of adjacent ride vehicles traveling along a loading zone track portion of a track along which the ride vehicles travel. The travel speed of the ride vehicles may substantially match the rotational speed of the loading platform such that relative movement between the ride vehicles and the loading platform is negligible, thereby facilitating passenger loading and unloading from the ride vehicles. In other words, in a loading/unloading configuration, an edge of the loading platform may be stationary relative to an edge of the ride vehicle to create a static physical interface or virtual engagement between the ride vehicle and the loading platform.

In order to manage guest traffic during the ride vehicle loading or unloading process, disclosed embodiments of the loading system include a gate system that selectively enables and blocks passengers from entering and/or exiting ride vehicles from the loading platform based on a position of the ride vehicles relative to the turntable or loading platform. The gate system includes a plurality of gates, such as swinging gates or "shotgun gates," positioned on the loading platform that are configured to align with a corresponding ride vehicle (e.g., a passenger seat location of the ride vehicle) during ride vehicle loading and unloading. In some embodiments of the gate system, stationary or fixed rails, such as "shotgun rails," may extend between each of the plurality of gates to prevent guests from exiting the loading platform toward a ride vehicle except through an open gate of the gate system.

Each of the gates is configured to open and close based on a position of a corresponding ride vehicle relative to the loading platform and therefore relative to the gate. More specifically, when a ride vehicle (e.g., a passenger seat location of the ride vehicle) is not proximate to or not radially aligned with one of the gates or gate passages (relative to a rotational axis of the loading platform), the gate will remain in a closed position to prevent guests from exiting the loading platform at an improper time. When a ride vehicle is proximate to and radially aligned with the gate or gate passage, the gate system will open the gate to enable a guest to enter or exit the ride vehicle. As discussed in detail below, the gate system includes a gate actuation system configured to control actuation of the gates between open and closed positions. The gate actuation system may include detectors, sensors, actuators, mechanical linkages, cams, or any other suitable components to enable actuation of the gates based on feedback indicative of a position of the ride vehicle. The ride vehicle may include a gate activation system of the gate system. The gate activation system is configured to provide the feedback to the gate actuation system. For example, the gate activation system of the ride vehicle may include identifiers, markers, emitters, engagement features, or any other suitable components configured to provide feedback indicative of a position of the ride vehicle to the gate actuation system. These and other features of the disclosed embodiments will be discussed in detail below.

Throughout the following discussion, it should be understood that "radial alignment" between a ride vehicle and a gate refers to radial alignment (relative to a rotational axis of the loading platform) of the ride vehicle and a space or section of the loading platform occupied by the corresponding gate when the gate is in a closed configuration. For example, a ride vehicle and a corresponding gate may become initially radially aligned once the ride vehicle reaches the gate along the loading platform. As a result, the gate system may transition the gate from a closed position to an open position, and in the open position the gate may no longer be radially aligned with the ride vehicle. Instead, a gate passage created by the gate in the open configuration is radially aligned with the ride vehicle as a passenger enters or exits the ride vehicle. Additionally, "radial alignment" may refer to substantial alignment of the ride vehicle and the gate or gate passage within an acceptable degree of tolerance (e.g., within 1, 2, 3, 4, 5, or more degrees of the circumference of the loading platform, within 2, 4, 6, 8, 10, 12, or more centimeters, and so forth).

Figure 1:
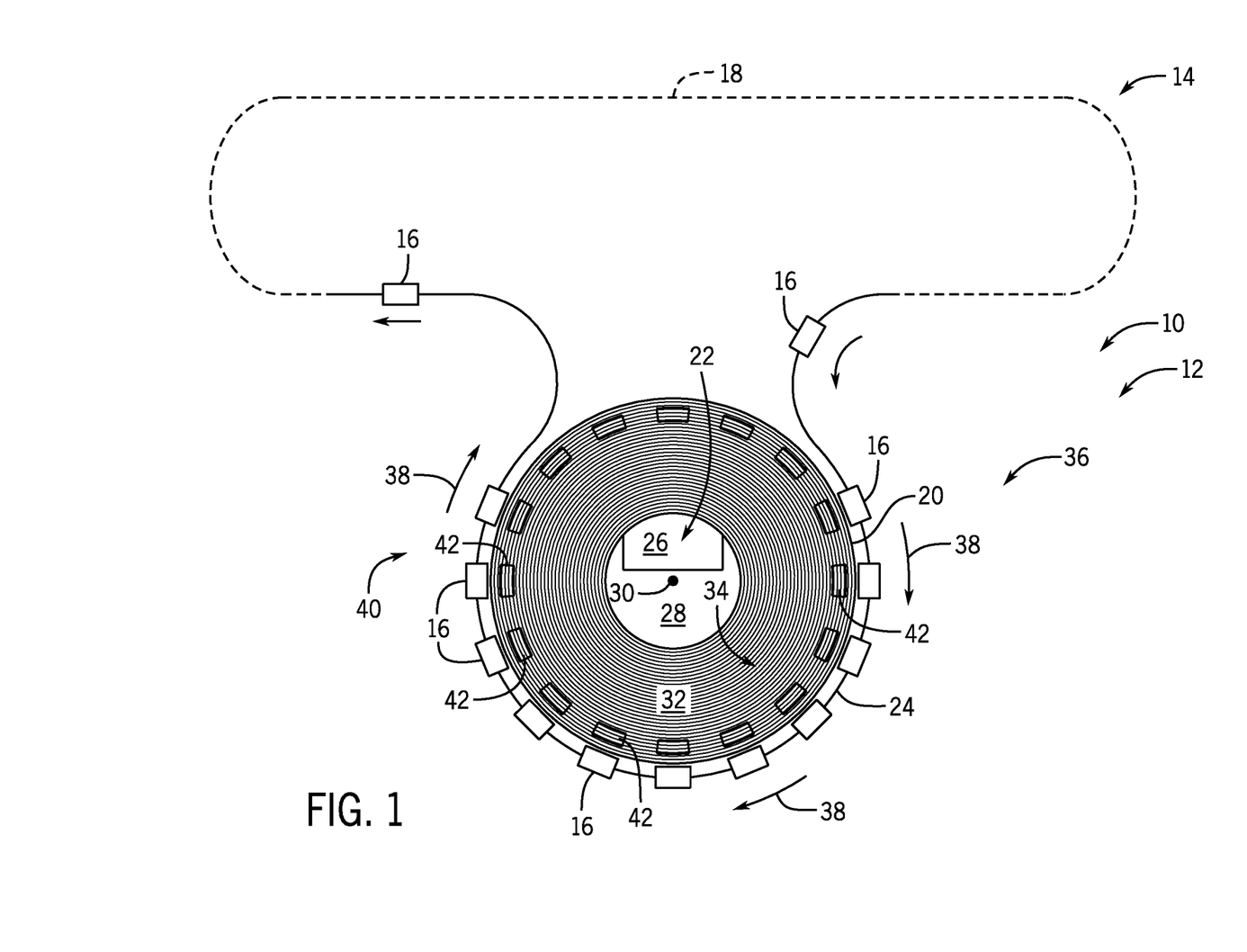
FIG. 1 is a schematic top view of an embodiment of a loading system for an amusement park attraction, in accordance with aspects of the present disclosure.

Turning now to the figures, FIG. 1 is a schematic top view of an embodiment of a loading zone 10 of a loading system 12. As shown, the loading zone 10 may be a portion of an overall ride system 14 (e.g., an amusement ride or attraction). For example, passengers may load into ride vehicles 16 in the loading zone 10, may travel along an attraction path 18 of the ride system 14, and may arrive back at the loading zone 10 to unload from the ride vehicles 16. While traveling along the attraction path 18, passengers may be exposed to a variety of experiences, such as virtual reality, alternate reality, environment interactions, multiple ride paths, water features, special effects, and so forth. It should be noted that portions of the ride system 14, such as the attraction path 18, have been intentionally simplified in order to focus on aspects of the loading system 12.

The loading system 12 includes a loading platform 20, an entrance 22, and a loading path 24 of the ride vehicles 16. The entrance 22 may include a ramp 26, a staircase, an elevator, or other path leading from an area beneath, above or adjacent the loading platform 20 to a stationary portion 28 of the loading platform 20. As shown, the loading platform 20 may extend circumferentially about a central vertical axis 30 to form a substantially planar surface in a plane orthogonal to the central vertical axis 30. In addition to the stationary portion 28, the loading platform 20 includes a rotational portion 32 (e.g., a rotational platform). The stationary portion 28 and the rotational portion 32 each extend about the central vertical axis 30 (e.g., a rotational axis), and the rotational portion 32 extends circumferentially around and radially outward from the stationary portion 28 relative to the central vertical axis 30. As shown, the stationary portion 28 may be substantially circular, with a center of the stationary portion 28 coaxial with the central vertical axis 30 and concentric with the rotational portion 32. However, in other embodiments, the stationary portion 28 and the rotational portion 32 may have other configurations (e.g., non-circular) and/or the loading system 12 or loading zone 10 may have additional stationary platforms, rotational platforms, and so forth. For example, the loading zone 10 may include a stationary platform on a side of the loading path 24 opposite the loading platform 20.

As mentioned above, the loading zone 10 also includes a gate system 34 configured to manage guest traffic in the loading zone 10 and, more particularly, to selectively enable and block passengers or guests from traveling between the loading platform 20 and the ride vehicles 16. The ride vehicles 16 enter the loading zone 10 from the attraction path 18. For example, the ride vehicles 16 may travel from the attraction path 18 to a first side 36 of the loading zone 10 and may travel clockwise 38 along the loading path 24 toward a second side 40 of the loading zone 10. As shown, the loading path 24 may be disposed at least partially about a perimeter (e.g., a circumference) of the loading platform 20. The loading path 24 may include a track or a conveyor along which the ride vehicles 16 travel. While the ride vehicle 16 is moving along the loading path 24, passengers may load and unload the ride vehicles 16, as permitted by the gate system 34.

The gate system 34 includes a plurality of gates 42 disposed on the loading platform 20 (e.g., the rotational portion 32) that are configured to remain in a normally closed position, thereby blocking guest travel between the loading platform 20 and the ride vehicles 16, until one of the ride vehicles 16 is proximate to and radially aligned (relative to the central vertical axis 30) with one of the gates 42 and remains radially aligned with the corresponding gate 42. For example, each gate 42 may remain in a closed position until a passenger seat location of one of the ride vehicles 16 becomes and remains radially aligned with the gate 42.

As mentioned above, the loading path 24 is a path along which the ride vehicles 16 travel while moving in conjunction with (e.g., together with or at the same speed as) the rotational portion 32 of the loading platform 20. While traveling along the loading path 24, the ride vehicles 16 may travel at substantially the same rotational speed as the rotational portion 32 of the loading platform 20. In this manner, a position and orientation of each ride vehicle 16 along the perimeter of the loading platform 20 may remain substantially constant. In other words, each ride vehicle 16 may maintain a temporarily fixed position relative to a circumference of the loading platform 20 while traveling through the loading path 24 and as the loading platform 20 rotates about the central vertical axis 30, such that the orientation of the loading platform 20 relative to the ride vehicle 16 (e.g., with seats facing towards a center or alongside an edge of the loading platform 20) is substantially maintained.

With the ride vehicle 16 and the gate 42 radially aligned and traveling at a substantially similar rotational speed, the gate system 34 is configured to open the gate 42 to enable a passenger to enter or exit the ride vehicle 16 via the loading platform 20. Once a passenger has entered the ride vehicle 16 and the ride vehicle 16 reaches the end of the loading path 24 on the second side 40 of the loading zone 10, the ride vehicle 16 re-enters the attraction path 18. When the ride vehicle 16 leaves the loading path 24 to re-enter the attraction path 18, the ride vehicle 16 is no longer proximate to and radially aligned with the corresponding gate 42. In response, the gate system 34 is configured to close the gate 42 to block passengers from leaving the loading platform 20. The operation of the gate system 34 is based on feedback indicative of a position of the ride vehicles 16 relative to the gates 42 and will be discussed in further detail below.

As will be appreciated, in some embodiments, existing passengers in the ride vehicles 16 may exit the ride vehicles 16 via the loading platform 20 on the first side 36 of the loading zone 10, and new passengers may enter the ride vehicles 16 via the loading platform 20 on the second side 40 of the loading zone 10. In other embodiments, one loading platform 20 may be used for loading passengers into the ride vehicles 16, and another loading platform 20 may be used for unloading passengers from the ride vehicles 16. It should be appreciated that any of the features described herein may be incorporated with loading zones 10 and/or loading platforms 20 having any of a variety of configurations and/or utilities.

Figure 2:
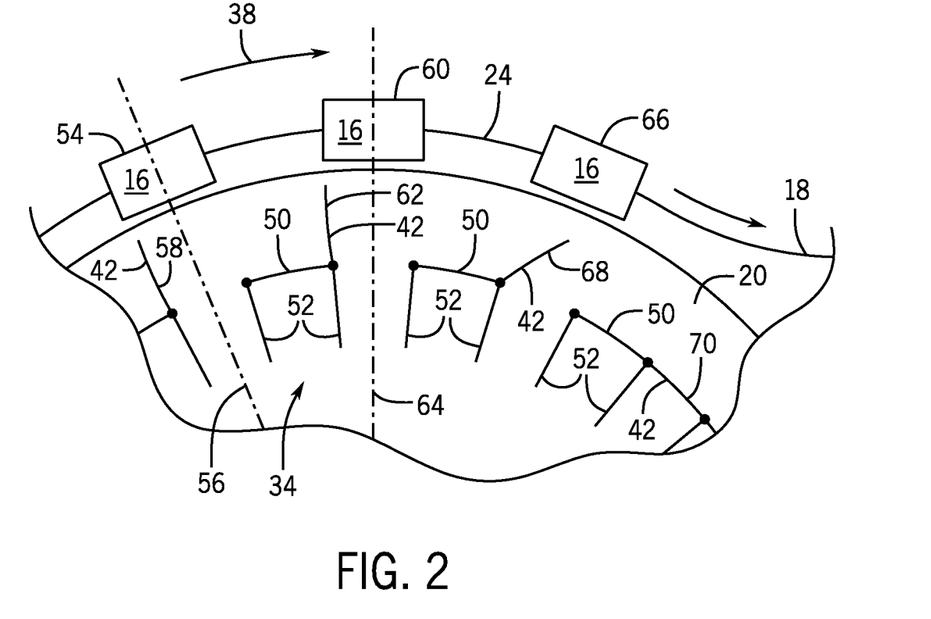
FIG. 2 is partial schematic top view of an embodiment of a loading system for an amusement park attraction, in accordance with aspects of the present disclosure.

FIG. 2 is a partial schematic top view of an embodiment of the loading zone 10 and the loading system 12, illustrating operation of the gate system 34. In the illustrated embodiment, the gate system 34 includes several gates 42 (e.g., shotgun gates) with stationary rails 50 extending between each of the gates 42. The gate system 34 also includes divider rails 52 associated with each gate 42 to facilitate formation of lines of passengers waiting to load into one of the ride vehicles 16. The stationary rails 50 and divider rails 52 are fixed to the loading platform 20 and remain stationary in relation to the loading platform 20 throughout operation of the gate system 34.

As discussed above, the loading path 24 extends at least partially about a circumference of the loading platform 20, which is configured to rotate as passengers enter and exit the ride vehicles 16. The gate system 34 includes gates 42 that are configured to remain in a closed position until one of the ride vehicles 16 radially aligns with one of the gates 42 and travels with the gate 42 at a substantially common rotational speed. When one of the ride vehicles 16 radially aligns and travels with one of the gates 42, the gate system 34 opens the gate 42 (e.g., after a time delay) to enable a passenger to enter or exit the ride vehicle 16 via the loading platform 20. For example, in the illustrated embodiment, a first ride vehicle 54 has radially aligned (e.g., as indicated by dashed line 56) and is traveling with a first gate 58 (e.g., a gate passage of the first gate 58) of the gate system 34. Accordingly, the gate system 34 has actuated the first gate 58 to be in an open configuration to enable a passenger to enter or exit the first ride vehicle 54. A second ride vehicle 60 and a second gate 62 (e.g., gate passage) are also radially aligned (e.g., as indicated by dashed line 64). Thus, the second gate 62 is also in an open configuration.

When the ride vehicle leaves the loading path 24 and re-enters the attraction path 18, the ride vehicle 16 will no longer be radially aligned with the gate 42 or associated gate passage, and the ride vehicle 16 may travel at a different (e.g., faster) speed than the rotational speed of the loading platform 20. Once the gate system 34 detects that the ride vehicle 16 is no longer aligned with and traveling with the gate 42, the gate system 34 closes the gate 42 to block passengers from exiting the loading platform 20 via the gate 42. In the illustrated embodiment, a third ride vehicle 66 is leaving the loading path 24 and is entering the attraction path 18. As shown, the third ride vehicle 66 is not radially aligned with a third gate 68 or associated gate passage with which the third ride vehicle 66 was previously aligned. Accordingly, the third gate 68 is illustrated as transitioning between an open configuration to a closed configuration (e.g., similar to the closed configuration of a fourth gate 70 of the gate system 34) via operation of the gate system 34.

Figure 3:
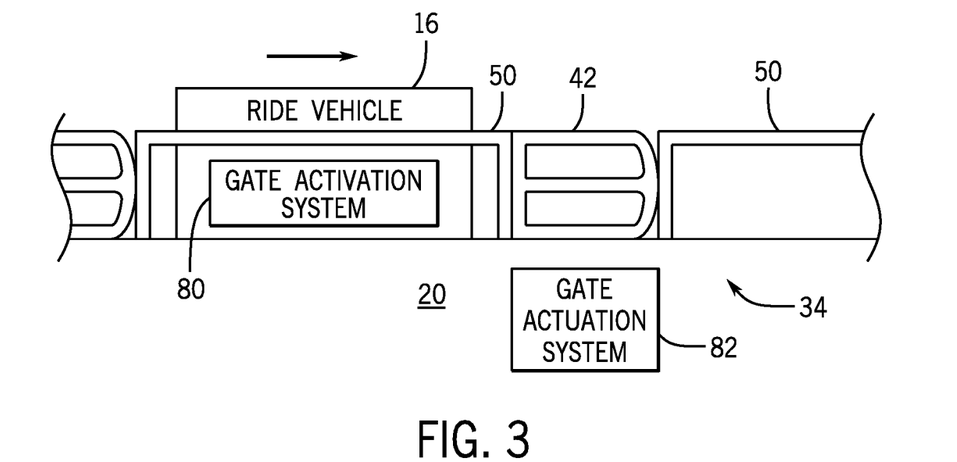
FIG. 3 is a schematic side view of an embodiment of a loading system for an amusement park attraction, illustrating a gate system of the loading system, in accordance with aspects of the present disclosure.

FIG. 3 is a partial side view schematic of the loading zone 10, illustrating one of the ride vehicles 16 approaching one of the gates 42 of the gate system 34. The illustrated embodiment also includes elements of the gate system 34 and the ride vehicle 16 that enable opening and closing of the gate 42 when the ride vehicle 16 radially aligns with the gate 42. More specifically, the ride vehicle 16 includes a gate activation system 80, and the gate system 34 includes a gate actuation system 82. More specifically, the gate actuation system 82 is associated with one of the gates 42 of the gate system 34. The gate activation system 80 and the gate actuation system 82 cooperatively function to open and close the gate 42 based on a position of the ride vehicle 16 relative to the gate 42. To this end, the gate activation system 80 includes features configured to provide feedback indicative of the position of the ride vehicle 16 to the gate actuation system 82. The gate actuation system 82 receives the feedback and controls operation of the gate 42 based on the feedback. When the gate actuation system 82 detects feedback from the gate activation system 80 indicative of radial alignment between the gate 42 and the ride vehicle 16, the gate actuation system 82 may actuate the gate 42 to transition from a closed position to an open position. Similarly, when the gate actuation system 82 detects that the ride vehicle 16 is no longer radially aligned with the gate 42, the gate actuation system 82 may actuate the gate 42 to transition from the open position to the closed position.

As will be discussed in detail below, the gate activation system 80 and the gate actuation system 82 may have any of a variety of configurations and components. For example, the gate activation system 80 and the gate actuation system 82 may be configured to activate and actuate the gate 42 utilizing electrical systems and components (e.g., sensors, motors, controllers, etc.). In another embodiment, the gate activation system 80 and the gate actuation system 82 may include mechanical components (e.g., linkages, gears, cams, etc.) configured to activate and actuate the gate 42 without electrical power. Other embodiments may utilize a combination of electrical and mechanical components to provide the functionality described herein.

Figure 4:
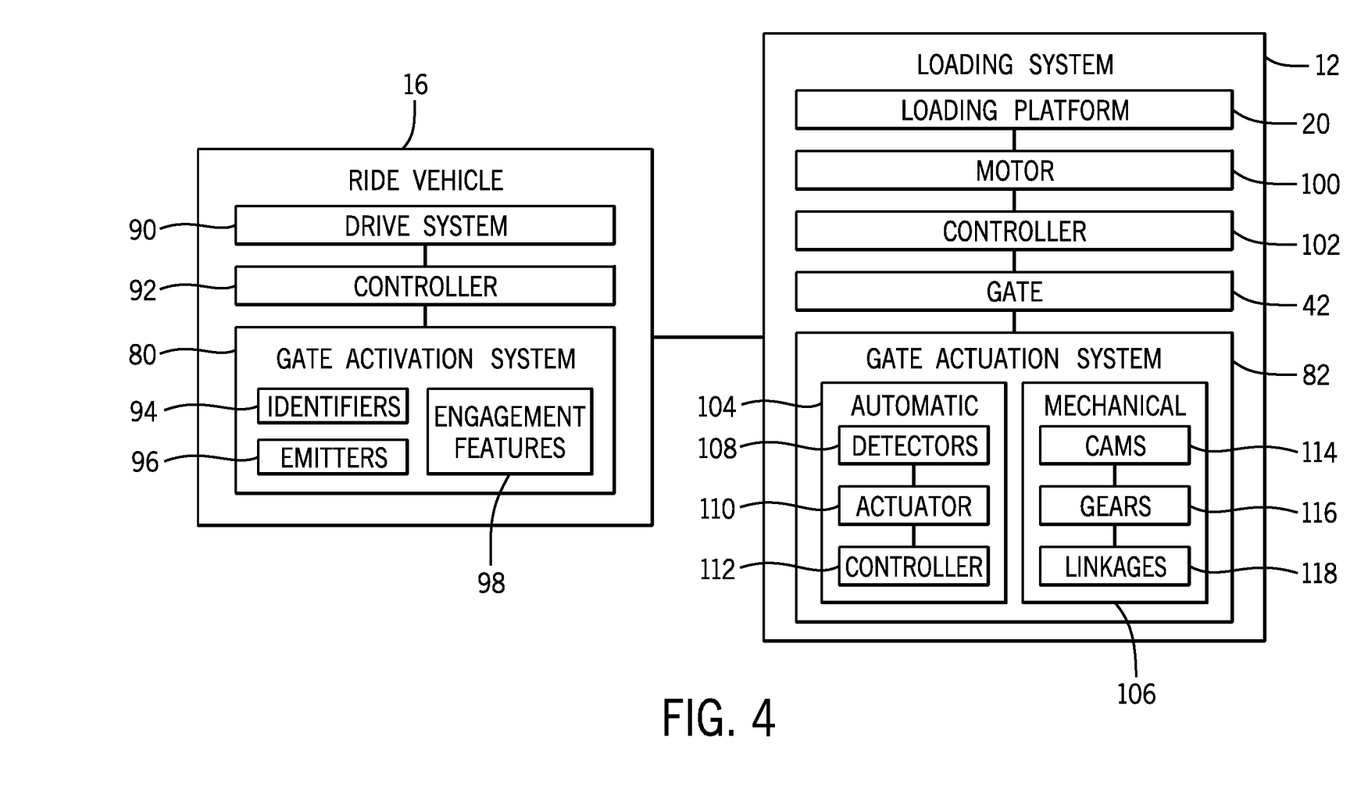
FIG. 4 is a block diagram of an embodiment of a loading system having a gate system for an amusement park attraction, in accordance with aspects of the present disclosure.

FIG. 4 is a schematic block diagram of an embodiment of the loading zone 10, illustrating the ride vehicle 16, the loading system 12, and various components of each. It will be appreciated that certain embodiments of the ride vehicle 16 and the loading system 12 may include additional components that are not shown and/or may omit certain components that are illustrated in the present embodiment.

The ride vehicle 16 includes a drive system 90, a controller 92, and the gate activation system 80. The drive system 90 may include components configured to drive movement of the ride vehicle 16 along the loading path 24 and/or along the attraction path 18. For example, the drive system 90 may include rollers, motors, transmissions, gears, chains, any combination thereof, or any other suitable components configured to drive movement of the ride vehicle 16 along the loading path 24 and/or the attraction path 18. In some embodiments, the drive system 90 may be a component or system of the loading path 24 or the loading system 12 and may engage with the ride vehicle 16 to translate the ride vehicle 16 along the loading path 24.

As mentioned above, the gate activation system 80 includes one or more components configured to provide feedback to the gate actuation system 82 of the gate system 34 indicative of a position of the ride vehicle 16 (e.g., a position of the ride vehicle 16 relative to the gate actuation system 82 and/or the gate 42). For example, the gate activation system 80 may include identifiers 94, emitters 96, and/or engagement features 98. The identifiers 94 may include retroreflective markers (e.g., paint, tape, panels, fabric, etc.), bar codes (e.g., linear bar codes, matrix bar codes, etc.), or other images, objects, symbols, etc. that may be detected, sensed, or scanned. The emitters 96 may be configured to output light, acoustic waves, electrical signals, radio frequency signals, magnetic fields, or another form of energy or matter for detection by the gate actuation system 82. The engagement features 98 may be configured to provide physical or virtual engagement between the ride vehicle 16 and the loading system 12 (e.g., the gate actuation system 82). For example, the engagement features 98 may include a boss or other protruding feature, magnets, hooks, gears, eyelets, shafts, or other components that may physically or virtually engage with the gate actuation system 82.

The controller 92 of the ride vehicle 16 is configured to regulate operation of one or more components of the ride vehicle 16, such as the drive system 90 and the gate activation system 80. The controller 92 may regulate operation of the drive system 90 to regulate a speed of the ride vehicle 16 along the loading path 24. For example, the controller 92 may control operation of the drive system 90 to cause the ride vehicle 16 to travel along the loading path 24 (e.g., at a speed greater than a rotational speed of the loading platform 20) to cause the ride vehicle 16 to approach and ultimately radially align with one of the gates 42 of the gate system 34. Similarly, the controller 92 may operate the drive system 90 to slow down if a speed of the ride vehicle 16 along the loading path 24 is greater than the rotational speed of the loading platform 20. The controller 92 may further regulate operation of the drive system 90 to cause the ride vehicle 16 to maintain radial alignment with one of the gates 42 (e.g., based on feedback and/or communication between the gate activation system 80 and the gate actuation system 82).

The loading system 12 includes the loading platform 20, a motor 100 configured to drive rotation of the rotational portion 32 of the loading platform 20, a controller 102, the gate 42 of the gate system 34, and the gate actuation system 82 for the gate 42. The controller 102 may be configured to control operation of the motor 100 to regulate a rotational speed of the loading platform 20. Operation of the motor 100 may be controlled based on feedback from any of the ride vehicles 16, feedback from the gate system 34, feedback from the loading system 12, and/or feedback from any other part of the amusement park ride or attraction, such as an operator interface.

As mentioned above, the gate actuation system 82 may include any of a variety of components configured to actuate the gate 42 between open and closed positions based on feedback and/or input from the gate activation system 80 of the ride vehicle 16. For example, the gate actuation system 82 may include an electrical system 104 (e.g., electrical actuation system) and/or a mechanical system 106 (e.g., mechanical actuation system). The electrical system 104 includes components that generally utilize electrical power, such as sensors or detectors 108, actuators 110, and/or a controller 112 to cooperatively actuate the gate 42 based on feedback from the gate activation system 80. For example, detectors 108 may detect a particular presence of one of the identifiers 94 and/or a particular output from one of the emitters 96 of the gate activation system 80. Based on the detection, the controller 112 may control the actuator 110 to open or close the gate 42. That is, when the detectors 108 detect a presence of the identifiers 94 and/or output of the emitters 96 indicative of the ride vehicle 16 being radially aligned with the gate 42, the controller 112 may operate the actuator 110 to transition the gate 42 to the open position. In some embodiments, the controller 112 may operate the actuator 110 to transition the gate 42 to the open position after executing a time delay that begins once an indication of radial alignment between the ride vehicle 16 and the gate 42 is detected. Thereafter, when the detectors 108 detect feedback from the identifiers 94 and/or emitters 96 indicative of the ride vehicle 16 not being radially aligned with the gate 42, the controller 112 may operate the actuator 110 to transition the gate 42 to the closed position. Operation of an embodiment of the electrical system 104 is discussed in more detail below with reference to FIG. 5.

The mechanical system 106 of the gate actuation system 82 may be included instead of or in addition to the electrical system 104. The mechanical system 106 includes components that may not utilize electrical power to actuate the gate 42 based on the presence and/or location of the ride vehicle 16. For example, the mechanical system 106 may include cams 114, gears 116, linkages 118 (e.g., levers, bars, etc.), and/or other physical components, such as springs, bearings, shafts, hooks, chains, belts, switches, and so forth. In operation, the engagement features 98 of the gate activation system 80 may be configured to engage with the mechanical system 106 of the gate actuation system 82 to actuate the gate 42 between open and closed positions. More particularly, the engagement features 98 and the components of the mechanical system 106 may be configured and arranged such that the engagement features 98 of the ride vehicle 16 physically contact and engage with the mechanical system 106 to transition the gate 42 from the closed position to the open position as the ride vehicle 16 travels along the loading path 24 to become radially aligned with the gate 42. Operation of an embodiment of the mechanical system 106 is discussed in more detail below with reference to FIGS. 6-8.

Figure 5:
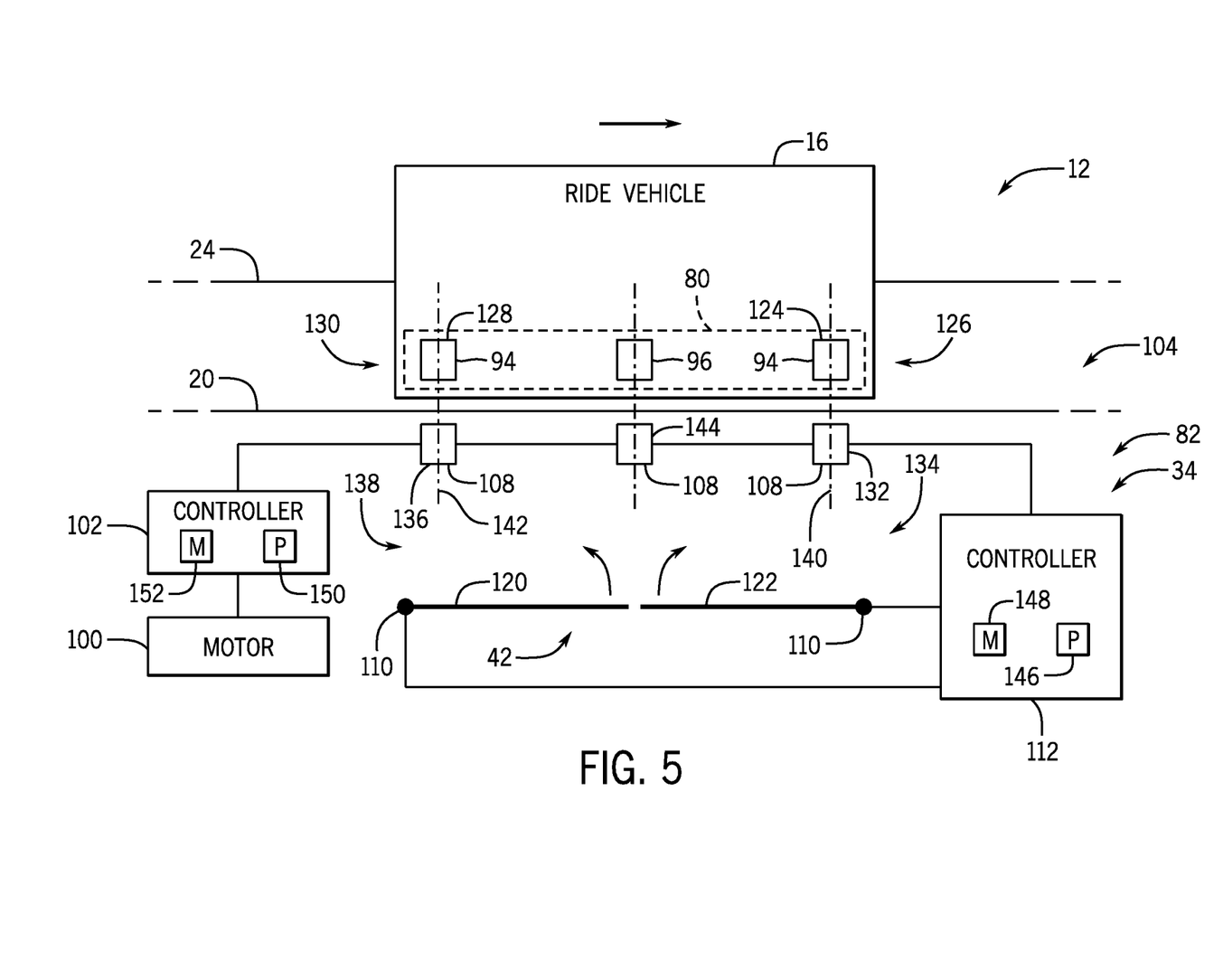
FIG. 5 is a schematic top view of an embodiment of an electrical actuation system for gate system of an amusement park attraction, in accordance with aspects of the present disclosure.

FIG. 5 is a schematic top view of an embodiment of the loading system 12 having the gate actuation system 82 with the electrical system 104. The gate activation system 80 of the ride vehicle 16 includes identifiers 94 and emitters 96. In some embodiments, the ride vehicle 16 may include only identifiers 94 or only emitters 96. As discussed above, the identifiers 94 and emitters 96 are configured to provide feedback indicative of a position of the ride vehicle 16 to the electrical system 104 of the gate actuation system 82, which is located on or adjacent the loading platform 20. Specifically, sensors or detectors 108 of the electrical system 104 are positioned adjacent one of the gates 42 of the gate system 34. In the illustrated embodiment, the gate 42 is a double swing shotgun gate having a first leaf 120 and a second leaf 122 that are each configured to transition between a closed position, as shown in FIG. 5, and an open position.

The detectors 108 are configured to detect a position of the ride vehicle 16 based on detection of a presence of one or more identifiers 94 and/or an output of one or more emitters 96. In the illustrated embodiment, the ride vehicle 16 includes a first identifier 124 positioned at a front or leading edge 126 of the ride vehicle 16 and includes a second identifier 128 positioned at a back or trailing edge 130 of the ride vehicle 16. The electrical system 104 of the gate actuation system 82 includes a first detector 132 positioned at a first end 134 of the gate 42 and a second detector 136 positioned at a second end 138 of the gate 42. It should be appreciated that the detectors 108 and identifiers 94 may be positioned in any other suitable locations in other embodiments.

The first and second detectors 132 and 136 may be optical sensors, cameras, or other detectors or sensors configured to detect the first and second identifiers 124 and 128. When the ride vehicle 16 travels along the loading path 24 and approaches the gate 42, the first identifier 124 may become aligned (e.g., radially aligned) with the first detector 132, as indicated by dashed line 140, and the second identifier 128 may become aligned (e.g., radially aligned) with the second detector 136, as indicated by dashed line 142. The first and second detectors 132 and 136 are configured to detect the alignment with the first and second identifiers 124 and 128, respectively, to verify that the ride vehicle 16 is radially aligned with the gate 42. To this end, the first and second identifiers 124 and 128 may be unique and/or different from one another, such that, for example, the second detector 136 does not mistake detection of the first identifier 124 for detection of the second identifier 128. Once the respective alignments of the identifiers 94 and detectors 108 is detected and maintained (e.g., for a time delay period), the controller 112 of the gate actuation system 82 may operate the actuators 110 to open the gate 42. In the illustrated embodiment, the first leaf 120 and the second leaf 122 of the gate 42 each have a separate actuator 110 to adjust the respective leaf between open and closed configurations.

A third detector 144 of the gate actuation system 82 is configured to detect an output of the emitter 96 of the ride vehicle 16. As mentioned above, the emitter 96 is configured to output light, sound, a magnetic field, radio waves, or any other suitable form of energy. The third detector 144 may be any suitable sensor configured to detect the output of the emitter 96. Based on the detection of the third detector 144, the controller 112 may determine a position of the ride vehicle 16. For example, the controller 112 may be configured to determine that the ride vehicle 16 is radially aligned with the gate 42 based on an intensity, a profile, a magnitude, a degree, or other measurement or quality of the output detected by the third detector 144. While the third detector 144 and the emitter 96 are positioned at an approximate center or midpoint of the gate 42 and the ride vehicle 16, respectively, in the illustrated embodiment, in other embodiments the third detector 114 and the emitter 96 may be placed at any suitable location.

The detections of the detectors 108 are transmitted to the controller 112, which is configured to operate the actuators 110 based on the detections. The controller 112 includes a processor 146, such as a microprocessor, which may execute software for controlling the components of the gate actuation system 82. The processor 146 may include multiple microprocessors, one or more "general-purpose" microprocessors, one or more special-purpose microprocessors, and/or one or more application specific integrated circuits (ASICS), or some combination thereof. For example, the processor 146 may include one or more reduced instruction set (RISC) processors. The controller 112 also includes a memory device 148 that may store information such as control software, look up tables, configuration data, etc. The memory device 148 may include a volatile memory, such as random access memory (RAM), and/or a nonvolatile memory, such as read-only memory (ROM). The memory device 148 may store a variety of information and may be used for various purposes. For example, the memory device 148 may store processor-executable instructions including firmware or software for the processor 146 to execute, such as instructions for controlling the actuators 110 based on various detections of the detectors 108. In some embodiments, the memory device 148 is a tangible, non-transitory, machine-readable-medium that may store machine-readable instructions for the processor 146 to execute. The memory device 148 may include ROM, flash memory, a hard drive, or any other suitable optical, magnetic, or solid-state storage medium, or a combination thereof. The memory device 148 may store data, instructions, and any other suitable data.

As mentioned above, additional control of the loading system 12 may be based on the detections of the detectors 108. In an embodiment, the controller 102 of the loading system 12 may be configured to control the motor 100 to drive rotation of the loading platform 20. For example, if the detectors 108 detect feedback from the identifiers 94 and/or emitters 96 indicative of the ride vehicle 16 and loading platform 20 moving at different speeds after being previously radially aligned (e.g., if the ride vehicle 16 speeds up or slows down relative to the rotation of the loading platform 20), the controller 102 may adjust operation of the motor 100 to compensate. In other words, the controller 102 may control the motor 100 to speed up or slow down (e.g., temporarily) the rotation of the loading platform 20 such that the gate 42 and the ride vehicle 16 become radially aligned again. In some embodiments, the controller 92 of the ride vehicle 16 may be configured to operate the drive system 90 to similarly compensate for uneven speeds of the ride vehicle 16 and the loading platform 20. To this end, the controller 92 of the ride vehicle 16, the controller 102 of the loading system 12, and/or the controller 112 of the gate actuation system 82 may be configured to communicate with one another. The controller 102 also includes a processor 150 and a memory device 152, which may be similar to the processor 146 and memory device 148 of the controller 112 discussed above.

Figure 6:
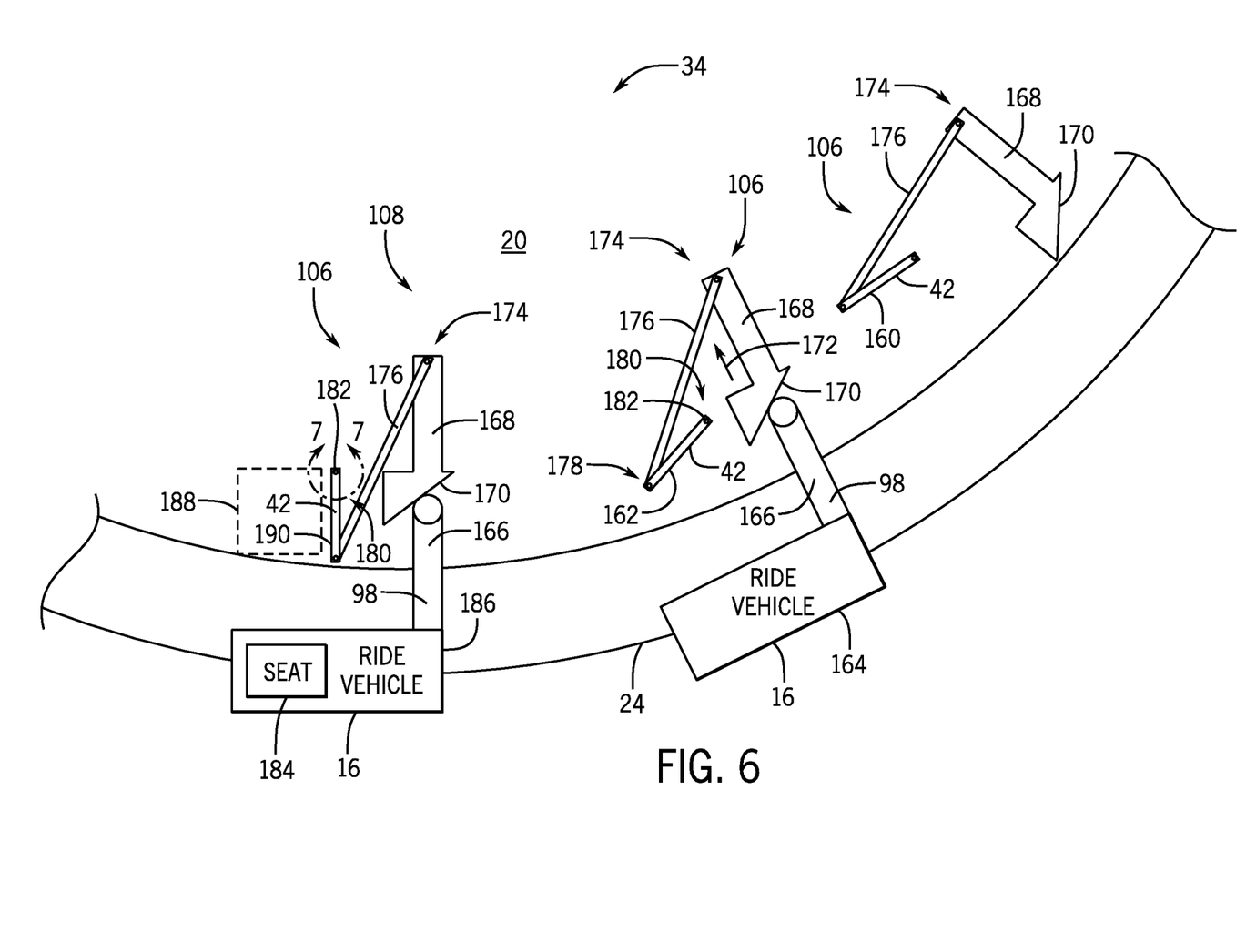
FIG. 6 is a schematic top view of an embodiment of a mechanical actuation system for a gate system of an amusement park attraction, in accordance with aspects of the present disclosure.

FIG. 6 is a schematic top view of an embodiment of the loading system 12 and the gate system 34, illustrating an embodiment of the mechanical system 108. The illustrated embodiment includes three gates 42 of the gate system 34, each gate 42 illustrating a different configuration based on engagement or disengagement of the gate 42 with respective engagement features 98 of ride vehicles 16. For example, a first gate 160 of the gate system 34 is not engaged with any engagement feature 98 of any ride vehicle 16. Accordingly, the first gate 160 is in the closed position to block passage of any guests on the loading platform 20. Each gate 42 may include springs, counterweights, or any other suitable feature to bias the gate 42 in the closed position when the mechanical system 108 of the gate is not engaged with any engagement features 98 of any ride vehicles 16.

A second gate 162 of the gate system 34 is shown as engaged with the engagement feature 98 of a first ride vehicle 164 in the illustrated embodiment. The engagement feature 98 is a protrusion or boss 166 that is configured to physically engage with the mechanical systems 106 of the gates 42. As the first ride vehicle 164 travels along the loading path 24 to approach the loading platform 20, the boss 166 contacts a lever 168 of the mechanical system 106 of the second gate 162. Specifically, the boss 166 contacts an angled surface 170 (e.g., a cam surface) of the lever 168, which enables the boss 166 to maintain contact with the lever 168 as the first ride vehicle 164 travels along the circumference of the loading platform 20 on the loading path 24. In other embodiments, the lever 168 may have a cam surface with a different (e.g., non-angled) configuration that is configured to engage with the boss 166.

As the first ride vehicle 164 approaches the loading platform 20 along the loading path 24, the boss 166 applies a force onto the lever 168, which causes the lever to move in a direction 172 (e.g., radially inward toward the central axis 28 of the loading platform 20). At an end 174 of the lever 168 opposite the angled surface 170, the lever 168 is pivotably coupled to a bar 176. The bar 176 is also pivotably coupled to a first end 178 of the gate 42 (e.g., the second gate 162) via a hinge or other pivotable connection, cam slots, plates, and/or other coupling features. A second end 180 of the gate 42 is coupled to the loading platform 20 at a pivot point 182. Thus, while the second end 180 of the gate 42 may rotate about the pivot point 182, the second end 180 of the gate 42 remains coupled to the loading platform 20 at the pivot point 182. The first end 178 of the gate 42, on the other hand, is not restricted to a single pivot point coupled to the loading platform 20 and may move along the loading platform 20. In some embodiments, the gate 42 may be rotated about the pivot point 182 without the first end 178 of the gate 42 coupled to the bar 176.

As discussed above, the gate 42 is configured to be in an open position once the ride vehicle 16 is radially aligned with the gate 42 and/or a gate passage of the gate 42. More specifically, the gate actuation system 82 may be configured to open the gate 42 when a passenger seat of the ride vehicle 16 is radially aligned with the gate 42 or a gate passage of the gate 42. For example, a passenger seat 184 of a second ride vehicle 186 in the illustrated embodiment is radially aligned with a gate passage 188 of a third gate 190 of the gate system 34. As will be appreciated, the third gate 190 may occupy the space of the gate passage 188 when the third gate 190 is in the closed position. However, when the third gate 190 is in the open position, as shown, the gate passage 188 is unobstructed to enable a guest or passenger to enter or exit the third ride vehicle 186.

As the ride vehicles 16 continue to travel along the loading path 24, the boss 166 of each ride vehicle 16 may slide along the angled surface 170 of the lever 168 until the boss 166 is no longer in contact with the lever 168. Once the boss 166 is no longer applying a force to the lever 168, the gate 42 may automatically return to the closed position, as represented by the first gate 160 in FIG. 6. The gate 42 may automatically return to the closed position due to a biasing force from an element of the gate actuation system 82, such as a spring. As will be appreciated, the biasing force of the spring or other element may be selected such that the biasing force may be overcome by the force of the boss 166 on the lever 168 to transition the gate 42 from the open position to the closed position. In some embodiments, the loading system 12 may include fixed elements (e.g., bosses, protrusions, etc.) positioned at the beginning and end of the loading path 24 that do not rotate with the loading platform 20. The fixed elements may be configured to unlock and lock the levers 168 of the gate system 34 to allow and block movement of the levers 168, respectively.

Figure 7:
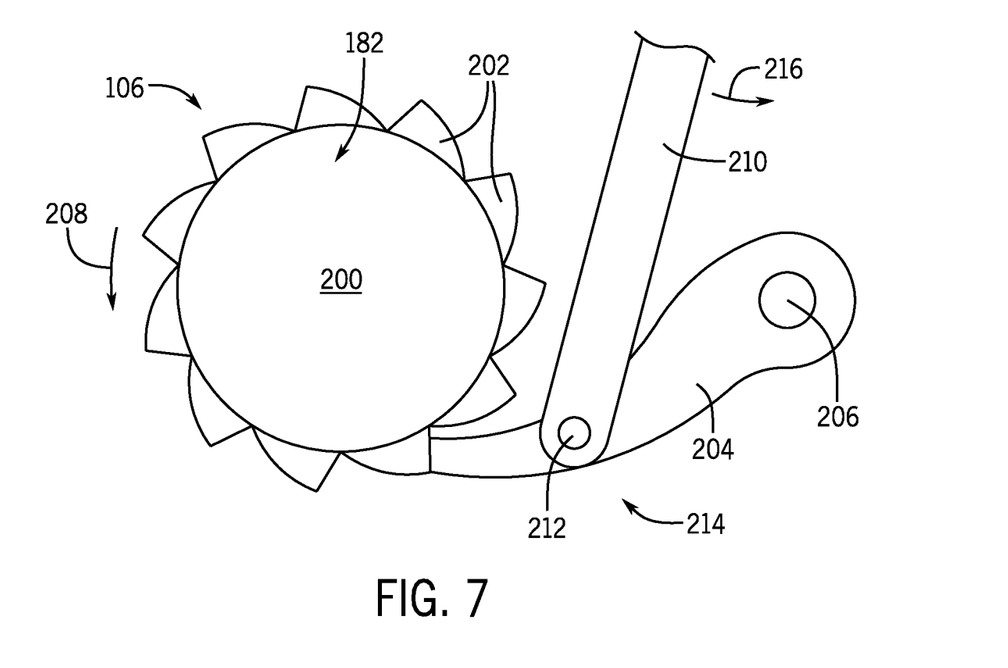
FIG. 7 is a partial schematic top view of an embodiment of a mechanical actuation system for a gate system of an amusement park attraction, in accordance with aspects of the present disclosure.
Figure 8:
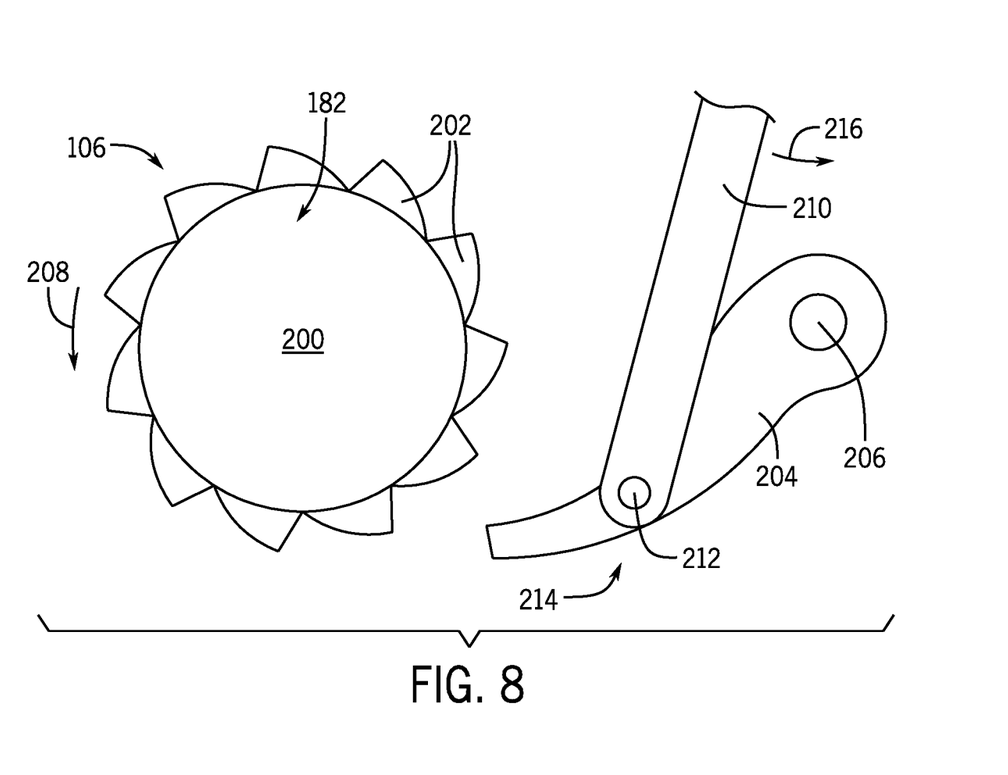
FIG. 8 is a partial schematic top view of an embodiment of a mechanical actuation system for a gate system of an amusement park attraction, in accordance with aspects of the present disclosure.

The mechanical system 106 may include additional features to increase the functionality of the gate actuation system 82. For example, FIGS. 7 and 8 are top detail views of the mechanical system 106, taken within line 7-7 of FIG. 6, illustrating the pivot point 182 at which the gate 42 is coupled to the loading platform 20. FIGS. 7 and 8 are discussed concurrently below.

The pivot point 182 includes a ratchet 200 having teeth 202 extending about a circumference of the ratchet 200. The ratchet 200 may be rotationally fixed with the gate 42. In the illustrated embodiment, the mechanical system 106 also includes a pawl 204, which may be coupled to the loading platform 20 or other component of the loading system 12 via a pin 206. The pawl 204 is configured to engage with the teeth 202 of the ratchet 200 when the gate 42 is in the closed position. For example, the mechanical system 106 may include springs or other biasing element configured to maintain engagement between the pawl 204 and the teeth 202 when the gate 42 is closed. Engagement between the pawl 204 and the teeth 202 blocks the ratchet 200, and therefore the gate 42, from rotating (e.g., in a direction 208) and inadvertently transitioning from the closed position to the open position. Indeed, the engagement between the pawl 204 and the teeth 202 may block rotational movement of the gate 42 towards the open position even if a force is applied to the gate 42 in an attempt to push the gate 42 from the closed position to the open position.

To enable rotation of the gate 42 from the closed position to the open position upon application of a force to the lever 168 (e.g., via the boss 166 of the ride vehicle 16), the mechanical system 106 includes a bar 210 pivotably coupled to the pawl 204 via a pin 212 at a first end 214 of the bar 210. A second, opposite end of the bar may be pivotably coupled to the lever 168, similar to the connection between the bar 176 and the lever 168 discussed above. When a force is applied to the lever 168, such as via the boss 166, movement of the lever 168 (e.g., in the direction 172 shown in FIG. 6) may cause the bar 210 to also move (e.g., in a direction 216). Consequently, the bar 210 may disengage the pawl 204 from the teeth 202 of the ratchet 200, as shown in FIG. 8, thereby enabling the gate 42 to rotationally transition from the closed position to the open position. It should be appreciated that, in other embodiments, the mechanical system 106 may include additional and/or alternative elements (e.g., cams, switches, gears, etc.) configured to enable actuation of the gate 42 based on a position the ride vehicle 16 without electrical power.

Thus, presently disclosed embodiments are directed to a gate system configured to selectively enable individual actuation of gates, such as shotgun gates, between open and closed positions based on a position of a corresponding ride vehicle of an amusement ride or attraction. When a ride vehicle approaches a loading zone, such as a loading platform of the amusement ride, a position of the ride vehicle may be detected (e.g., electronically and/or mechanically), and the gate system is configured to open a gate corresponding to the ride vehicle when a particular position of the ride vehicle is detected by the gate system. For example, the gate system may open the corresponding gate when a seat location of the ride vehicle is aligned with the gate. When the seat location is no longer aligned with the gate, the gate system is configured to transition the gate from the open position to the closed position, thereby regulating ride passenger traffic (e.g., loading and unloading of the ride vehicles) at the loading zone.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gate system for an amusement park attraction, comprising:
a loading platform configured to rotate about a central vertical axis of the loading platform;
a gate positioned on the loading platform, wherein the gate is configured to transition between a closed position and an open position;
a gate actuation system coupled to the loading platform, wherein the gate actuation system is configured to actuate the gate between the closed position and the open position based on feedback indicative of a position of a ride vehicle relative to the gate.

2. The gate system of claim 1, comprising the ride vehicle, wherein the ride vehicle comprises a gate activation system configured to provide the feedback indicative of the position of the ride vehicle relative to the gate to the gate actuation system.

3. The gate system of claim 2, comprising an identifier of the gate actuation system affixed to the ride vehicle, wherein the identifier comprises a retroreflective marker, an image, a barcode, or any combination thereof.

4. The gate system of claim 3, wherein the gate actuation system comprises a detector configured to detect the identifier, and the feedback indicative of the position of the ride vehicle relative to the gate comprises detection of the identifier.

5. The gate system of claim 2, wherein the gate activation system comprises a boss extending from the ride vehicle, the gate actuation system comprises a lever pivotably coupled to the gate, and the boss is configured to engage with the lever to pivot the gate from the closed position to the open position.

6. The gate system of claim 5, wherein the gate comprises a ratchet, the gate actuation system comprises a pawl configured to engage with the ratchet in the closed position of the gate, the pawl is pivotably coupled to the lever, and engagement of the boss with the lever causes disengagement of the pawl from the ratchet.

7. The gate system of claim 6, wherein the ratchet is rotationally fixed to the gate.

8. The gate system of claim 1, wherein the gate actuation system is configured to actuate the gate from the closed position to the open position based on feedback indicative of the ride vehicle being proximate to the gate and radially aligned with the gate relative to the central vertical axis.

9. The gate system of claim 8, wherein the gate actuation system is configured to receive the feedback indicative of the ride vehicle being radially aligned with the gate relative to the central vertical axis, execute a time delay, and subsequently actuate the gate from the closed position to the open position after execution of the time delay.

10. The gate system of claim 8, wherein the gate actuation system is configured to actuate the gate from the open position to the closed position based on feedback indicative of the ride vehicle transitioning from being proximate to the gate and radially aligned with the gate relative to the central vertical axis to being not proximate to the gate and/or not radially aligned with the gate relative to the central vertical axis.

11. The gate system of claim 1, comprising:
a motor configured to drive rotation of the loading platform; and
a controller configured to adjust operation of the motor based on the feedback indicative of the position of the ride vehicle relative to the gate.

12. The gate system of claim 1, comprising:
the ride vehicle, wherein the ride vehicle comprises a drive system configured to drive movement of the ride vehicle along a loading path extending about the loading platform; and
a controller configured to adjust operation of the ride vehicle based on the feedback indicative of the position of the ride vehicle relative to the gate.

13. A method for controlling passenger traffic during loading or unloading of a ride vehicle of an amusement park attraction, comprising:
guiding the ride vehicle along a loading path extending about a rotating loading platform;
detecting a position of the ride vehicle relative to a shotgun gate positioned on the rotating loading platform with a gate actuation system positioned on the rotating loading platform; and automatically transitioning the shotgun gate from a closed position to an open position based on the position of the ride vehicle relative to the shotgun gate.

14. The method of claim 13, wherein detecting the position of the ride vehicle relative to the shotgun gate comprises detecting an identifier of the ride vehicle with a detector of the gate actuation system, wherein the identifier is a retroreflective marker.

15. The method of claim 14, comprising automatically transitioning the shotgun gate from the closed position to the open position based on the position of the ride vehicle being proximate to the shotgun gate and radially aligned with the shotgun gate relative to a rotational axis of the rotating loading platform.

16. The method of claim 13, comprising:
engaging a boss protruding from the ride vehicle with a lever of the gate actuation system; and
transferring motion of the lever to the shotgun gate to transition the shotgun gate from the closed position to the open position.

17. The method of claim 13, comprising automatically transitioning the shotgun gate from the open position to the closed position based on the ride vehicle transitioning from a first position proximate to and in alignment with the shotgun gate to a second position not proximate to and/or out of alignment with the shotgun gate.

18. A gate system for controlling passenger traffic in a loading zone of an amusement ride, comprising:
a rotating loading platform configured to rotate about a rotational axis, wherein the rotating loading platform comprises a shotgun gate disposed thereon;
a ride vehicle configured to travel along a loading path extending about the rotating loading platform, wherein the ride vehicle comprises a gate activation system configured to provide feedback indicative of a position of the ride vehicle relative to the shotgun gate; and
a gate actuation system configured to receive the feedback indicative of the position of the ride vehicle relative to the shotgun gate and to transition the gate between an open position and a closed position based on the feedback.

19. The gate system of claim 18, comprising a motor configured to drive rotation of the rotating loading platform and a controller configured to regulate operation of the motor, wherein the controller is configured to adjust operation of the motor based on the feedback indicative of the position of the ride vehicle relative to the shotgun gate to maintain radial alignment of the ride vehicle and the shotgun gate with respect to a rotational axis of the rotating loading platform.

20. The gate system of claim 18, wherein the gate activation system comprises a boss protruding from the ride vehicle, the gate actuation system comprises a lever pivotably coupled to the shotgun gate, and the boss and the lever are configured to engage with one another to transition the shotgun gate from the closed position to the open position, such that the shotgun gate is in the open position upon alignment of the ride vehicle with the shotgun gate.

21. The gate system of claim 18, wherein the gate activation system comprises a retroreflective marker affixed to the ride vehicle, and the gate actuation system comprises:
a detector configured to detect the retroreflective marker;
an actuator configured to actuate the shotgun gate between the open position and the closed position; and
a controller configured to control the actuator to actuate the shotgun gate from the closed position to the open position upon detection of the retroreflective marker by the detector indicative of alignment of the ride vehicle and the shotgun gate.

* * * * *